US010768695B2

(12) United States Patent
Ranganathan et al.

(10) Patent No.: US 10,768,695 B2
(45) Date of Patent: Sep. 8, 2020

(54) ARTIFICIAL REALITY SYSTEM HAVING ADAPTIVE DEGREES OF FREEDOM (DOF) SELECTION

(71) Applicant: Facebook Technologies, LLC, Menlo Park, CA (US)

(72) Inventors: Ananth Ranganathan, Santa Clara, CA (US); Andrew Melim, Redwood City, CA (US); Ioannis Pavlidis, Newark, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/264,805

(22) Filed: Feb. 1, 2019

(65) Prior Publication Data

US 2020/0249748 A1    Aug. 6, 2020

(51) Int. Cl.
*A63F 13/212*    (2014.01)
*A63F 13/428*    (2014.01)
(Continued)

(52) U.S. Cl.
CPC ............ *G06F 3/012* (2013.01); *A63F 13/212* (2014.09); *A63F 13/40* (2014.09); *G06F 1/3206* (2013.01);
(Continued)

(58) Field of Classification Search
CPC ...... A63F 13/217; A63F 13/25; A63F 13/358; A63F 13/00; A63F 13/20; A63F 13/21;
(Continued)

(56) References Cited

U.S. PATENT DOCUMENTS 9,430,038 B2    8/2016  Ebstyne et al.
10,127,732 B1 * 11/2018  Katz ................... G02B 27/017
(Continued)

FOREIGN PATENT DOCUMENTS

WO    WO-2015168041 A1 * 11/2015 ............. G06T 13/80
WO    WO-2015168343 A1 * 11/2015 ............. G06F 3/012

OTHER PUBLICATIONS

He et al, "An inertial and Optical Sensor Fusion Approach for Six Degree-of-Freedom Pose Estimation", Sensors 2015, 15, 16448-16465. (Year: 2015).*
(Continued)

*Primary Examiner* — Julie Anne Watko
(74) *Attorney, Agent, or Firm* — Shumaker & Sieffert, P.A.

(57) ABSTRACT

An artificial reality system is described that implements adaptive degrees-of-freedom (DOF) selection when tracking frames of reference and rendering artificial reality content. In one example, the artificial reality system comprises a head mounted display (HMD) that outputs rendered artificial reality content. A performance monitor determines one or more performance indicators associated with the artificial reality system. A degree-of-freedom (DOF) selector applies one or more policies to the performance indicators to select between a first mode in which a pose tracker computes one or more poses of the HMD within the 3D environment using 6DOF and a second mode in which the pose tracker computes the one or more poses using 3DOF. The pose tracker computes the one or more poses for the HMD within the 3D environment in accordance with the selected mode. A rendering engine renders the content for the artificial reality application based on the computed pose.

20 Claims, 8 Drawing Sheets

(51) Int. Cl.
*G06F 3/01* (2006.01)
*G06F 1/3234* (2019.01)
*G06F 1/3206* (2019.01)
*A63F 13/40* (2014.01)
*A63F 13/217* (2014.01)
*A63F 13/358* (2014.01)

(52) U.S. Cl.
CPC ............ *G06F 1/3234* (2013.01); *G06F 3/013* (2013.01); *A63F 13/217* (2014.09); *A63F 13/358* (2014.09); *A63F 13/428* (2014.09); *G06F 1/3265* (2013.01)

(58) Field of Classification Search
CPC .... A63F 13/211; A63F 13/212; A63F 13/428; A63F 13/40; G06F 3/012; G06F 3/013; G06F 3/011; G06F 3/01; G06F 3/00; G06F 1/3265; G06F 1/325; G06F 1/3234; G06F 1/3203; G06F 1/32; G06F 1/26; G06F 1/00; G06F 1/3287; G06F 1/3293; G06F 3/005; G06F 1/3206; G06F 3/3209; G06F 1/3212; G06F 1/3215; G06F 1/3218; G06F 1/3225; G06F 1/3221; G06F 1/3228; G06F 1/3231; G06F 3/325
See application file for complete search history.

(56) References Cited

U.S. PATENT DOCUMENTS

| | | | |
|---|---|---|---|
| 2012/0188233 A1* | 7/2012 | Shuster | G06T 15/20 345/419 |
| 2012/0300020 A1* | 11/2012 | Arth | G06T 7/75 348/36 |
| 2013/0050258 A1* | 2/2013 | Liu | G02B 27/017 345/633 |
| 2013/0326364 A1* | 12/2013 | Latta | G06F 3/012 715/751 |
| 2014/0320593 A1* | 10/2014 | Pirchheim | H04N 5/23238 348/36 |
| 2018/0114364 A1 | 4/2018 | McPhee et al. | |
| 2018/0284872 A1* | 10/2018 | Schluessler | G06F 1/3265 |
| 2019/0369850 A1* | 12/2019 | Roy | G06F 3/04847 |

OTHER PUBLICATIONS

International Search Report and Written Opinion of International Application No. PCT/US2020/015940, dated Apr. 28, 2020, 12 pp.

* cited by examiner

ARTIFICIAL REALITY SYSTEM HAVING ADAPTIVE DEGREES OF FREEDOM (DOF) SELECTION

TECHNICAL FIELD

This disclosure generally relates to artificial reality systems, such as virtual reality, mixed reality and/or augmented reality systems, and more particularly, to head-mounted displays (HMDs) and other components of artificial reality systems.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof.

Typical artificial reality systems include one or more devices for rendering and displaying content to users. As one example, an artificial reality system may incorporate a head-mounted display (HMD) worn by a user and configured to output artificial reality content to the user. In particular, the artificial reality system typically computes a current pose (e.g., position and orientation) of a frame of reference, such as the HMD, and selectively renders the content for display to the user based on the current pose. The artificial reality content may include completely-generated content or generated content combined with captured content (e.g., real-world video and/or images).

SUMMARY

In general, this disclosure describes an artificial reality system having adaptive degrees-of-freedom (DOF) selection. As further described herein, the artificial reality system monitors various operating conditions and adaptively selects different DOF for use in computing one or more poses from one or more frames of reference of the artificial reality system. The artificial reality system monitors operating conditions that may affect the ability of the system to accurately track the frames of reference, such as a display of a head mounted display (HMD), and render quality artificial reality content based on a current viewing perspective of the frame of reference. Example operating conditions include feature tracking quality, feature lighting quality, network performance, computing resource usage, or other factors that may negatively impact the ability of system. The artificial reality system applies policies to performance indicators determined from the monitored conditions to adaptively select between different DOF for computation of the one or more poses in real-time or pseudo-real-time. For example, the artificial reality system may apply policies to the performance indicators to select between computing poses using 6DOF (e.g., both rotation and translational movement along axes of the frame of reference) or computing poses using only 3DOF (e.g., only rotational movement along axes of the frame of reference).

Accordingly, the techniques of the disclosure provide specific improvements to the computer-related field of rendering and displaying content within an artificial reality system. For example, an artificial reality system as described herein may provide a high-quality artificial reality experience to a user of the artificial reality system by computing poses using 6DOF. Further, such a system may seamlessly switch to computing poses using 3DOF if performance indicators indicate that the user experience would suffer if the poses were to be computed using 6DOF. As examples, systems as described herein may avoid using 6DOF where software, hardware, network, or environmental conditions would otherwise cause degradation of the user experience. Further, example systems as described herein may reduce negative effects experienced by some users of artificial reality systems, such as disorientation, nausea, "swimminess," and other side effects.

In one example, this disclosure describes an artificial reality system comprising an HMD configured to output artificial reality content. The system further comprises a pose tracker configured to compute one or more poses of the HMD within a three-dimensional (3D) environment and a performance monitor, executing on one or more processors, configured to determine one or more performance indicators associated with the artificial reality system. The system further comprises a DOF selector configured to apply one or more policies to the performance indicators to select between a first mode in which the pose tracker is configured to compute the one or more poses of the HMD using 6DOF and a second mode in which the pose tracker is configured to compute the one or more poses using 3DOF. A rendering engine of the system is configured to render the artificial reality content based on the computed pose.

In another example, this disclosure describes a method comprising determining one or more performance indicators associated with an artificial reality system having at least one HMD and applying one or more policies to the performance indicators to select between a first mode in which one or more poses of the HMD within a 3D environment are computed using 6DOF and a second mode in which the one or more poses are computed using 3DOF. The method further comprises computing the one or more poses for the HMD within the 3D environment in accordance with the selected mode, rendering artificial reality content based on the computed one or more poses, and outputting, by the HMD, the rendered artificial reality content.

In another example, this disclosure describes a non-transitory, computer-readable medium comprising instructions that, when executed, cause one or more processors to determine one or more performance indicators associated with an artificial reality system having at least one HMD and apply one or more policies to the performance indicators to select between a first mode in which one or more poses of the HMD within a 3D environment are computed using 6DOF and a second mode in which the one or more poses are computed using 3DOF. The instructions are further configured to cause the one or more processors to compute the one or more poses for the HMD within the 3D environment in accordance with the selected mode, render artificial reality content based on the computed one or more poses, and output the rendered artificial reality content.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1A:
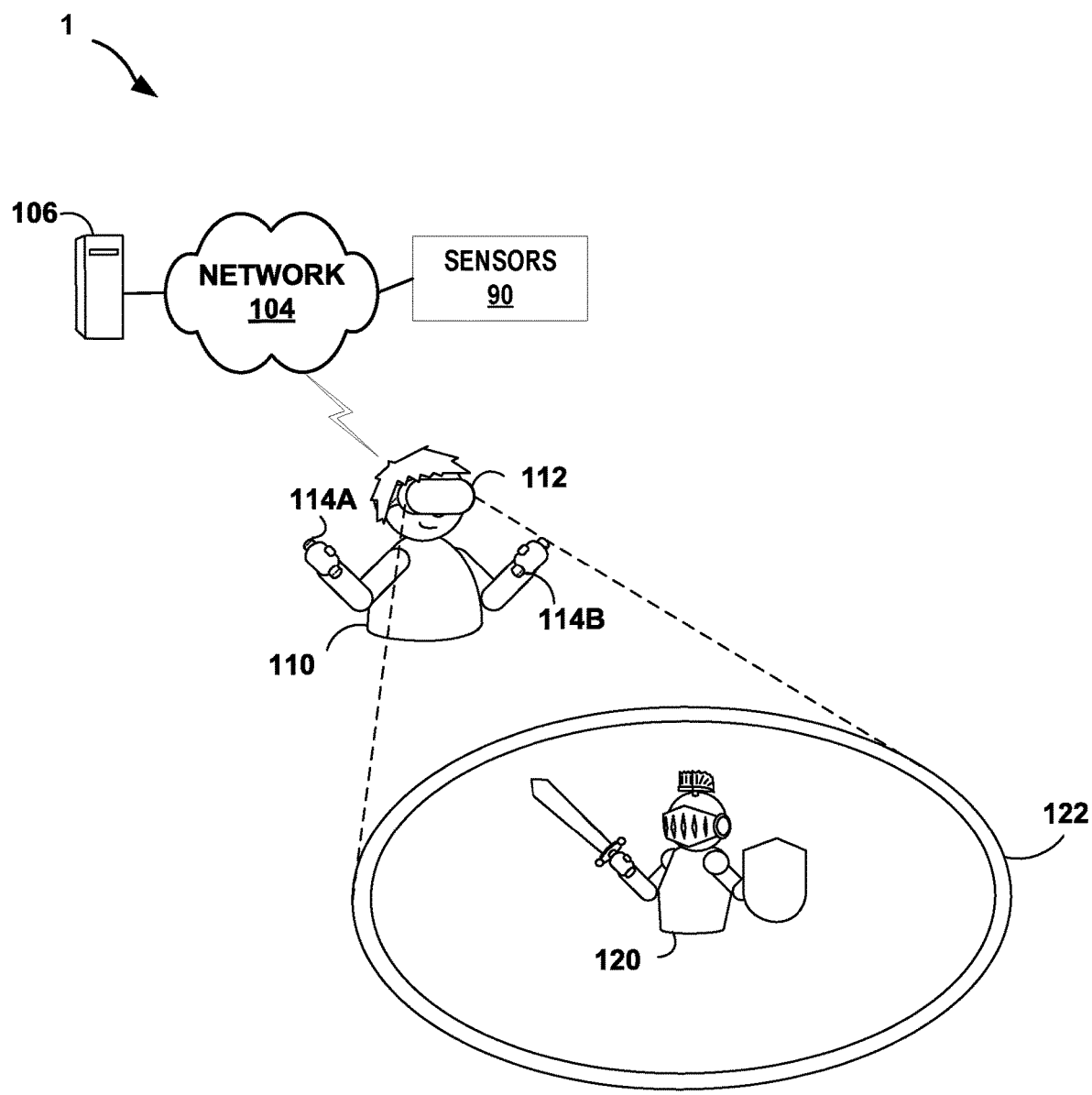
FIG. 1A is an illustration depicting an example artificial reality system that adaptively selects DOF for use in computing one or more poses for a frame of reference and when rendering content to a user in accordance with the techniques of the disclosure.

FIG. 1A is an illustration depicting an example artificial reality system 1 that adaptively selects degrees of freedom (DOF) for use in computing one or more poses of a frame of reference when rendering content to user 110 in accordance with the techniques of the disclosure. As further explained below, in this example, console 106 and/or HMD 112 monitor performance indicators of artificial reality system 1 and, based on application of policies to the monitored performance indicators, performs adaptively selection of DOF for use during pose computation of a frame of reference, such as a display of HMD 112. As explained, in this way, artificial reality system 1 may operate to provide a high-quality and more realistic artificial reality experience for user 110 and avoid inaccuracies that may otherwise arise.

In the example of FIG. 1A, artificial reality system 1 includes HMD 112, controllers 114A-114B (collectively, "controllers 114"), console 106 and, in some examples, one or more sensors 90. As shown, HMD 112 is typically worn by user 110 and includes an electronic display and optical assembly for presenting artificial reality content 122 to the user. In addition, HMD 112 includes one or more sensors (e.g., accelerometers) for tracking motion of the HMD and may include one or more image capture devices, e.g., cameras, line scanners and the like, for capturing image data of the surrounding environment. Each controller 114 is an input device which user 110 may use to provide input to console 106, a respective HMD 112, or another component of artificial reality system 1. In this example, console 106 is shown as a single computing device, such as a gaming console, workstation, a desktop computer, or a laptop. In other examples, console 106 may be distributed across a plurality of computing devices, such as a distributed computing network, a data center, or a cloud computing system. Console 106, HMD 112, controllers 114 and sensors 90 may, as shown in this example, be communicatively coupled via network 104, which may be a wired or wireless network, such as WiFi, a mesh network or a short-range wireless communication medium. Although HMD 112 is shown in this example as in communication with, e.g., tethered to or in wireless communication with, console 106, in some implementations HMD 112 operates as a stand-alone, mobile artificial reality system.

In general, artificial reality system 1 uses information captured from a real-world 3D environment to render artificial reality content 122 for display to user 110. In the example of FIG. 1A, user 110 views the artificial reality content 122 constructed and rendered by an artificial reality application executing on console 106 and/or HMD 112. As one example, artificial reality content 122 may be a consumer gaming application in which user 110 is rendered as avatar 120 with, in some examples, as a mixture of real-world imagery and virtual objects, e.g., mixed reality and/or augmented reality. In other examples, artificial reality content 122 may be, e.g., a video conferencing application, a navigation application, an educational application, training or simulation applications, or other types of applications that implement artificial reality.

During operation, the artificial reality application constructs artificial content for display to user 110 by tracking and computing pose information for a frame of reference, typically a viewing perspective of HMD 112. Based on the current viewing perspective, the artificial reality application renders the 3D, artificial reality content which may be overlaid, at least in part, upon the real-world 3D environment of user 110. During this process, the artificial reality application uses sensed data received from HMD 112, such as movement information and user commands, and, in some examples, data from any external sensors 90, such as external cameras, to capture 3D information within the real world environmental, such as motion by user 110 and/or feature tracking information with respect to user 110. Based on the sensed data, the artificial reality application determines a current pose for the frame of reference of HMD 112 and, in accordance with the current pose, renders the artificial reality content. More specifically, the artificial reality application processes the received information to compute updated pose information for a frame of reference, e.g., a display of HMD 112, representative of motion (i.e., rotations and/or translation) with respect to a set of DOF.

Moreover, in accordance with the techniques of the disclosure, the artificial reality application performs adaptive DOF selection based on performance indicators determined by the application with respect to current operating conditions or characteristics of artificial reality system 1. That is, as further described herein, the artificial reality application monitors operating conditions to determine current performance indicators that may affect and degrade the quality of artificial reality content 122. Example operating conditions monitored by the artificial reality application include feature tracking quality, feature lighting quality, network performance, computing resource usage, eye tracking quality, environmental brightness, line-of-sight or other visibility conditions affecting image tracking, image texture, rendering quality, network performance or latency, computing resource usage, jitter or any other factors that may negatively impact the ability of system to accurately compute updated pose information for one or more frames of reference.

The artificial reality application adaptively applies one or more policies to the current performance indicators to dynamically select, in real-time or pseudo real-time, between different sets of permissible DOF for estimated motion (i.e., estimated rotations and translations) to be used in computing an updated pose for the frame of reference of HMD 112. When determining an updated pose for the frame of reference and rendering content for the current viewing perspective, the artificial reality application processes current motion data using the selected DOF, which in some examples may be only a subset of the available DOF. In other words, based on the current motion data capture from controllers 114 and/or sensors 90, the artificial reality application computes estimated movement of the frame of reference with respect to only the permissible DOF of the selected set, thereby operating to provide a high-quality and more realistic artificial reality experience for user 110 and avoid inaccuracies that may otherwise arise.

In some examples, each performance indicator is associated with a corresponding performance threshold defined by a policy, which may be configurable by user 110. In some implementations, artificial reality system 1 applies the policies to the performance indicators to determine whether a transition condition has been satisfied, thereby triggering usage of a different set of DOF. Upon meeting or exceeding the performance threshold value for a particular performance indicator, artificial reality system 1 dynamically selects between the different sets of permissible DOF to be used in computing an updated pose for the frame of reference of HMD 112.

As one example, artificial reality system 1 may monitor operating conditions and characteristics to determine current performance indicators and apply policies to the performance indicators to dynamically select between a first mode in which computed motion of the frame of reference is permitted with respect to a full 6DOF (e.g., both rotational and translational movement of the frame of reference) and a second mode in which motion of the frame of reference is permitted with respect to only 3DOF (e.g., rotational movement of the frame of reference). The use of full 6DOF when computing updated poses for the frame of reference may provide numerous advantages over the use of 3DOF. For example, permitting rotational motion by HMD 112 and translational movement may allow for the rendering of more realistic and engaging artificial reality content in a manner that more accurately represents real-world movement. However, the degradation of various performance indicators may negatively affect the ability of artificial reality system 1 to accurately compute poses for a frame of reference or render artificial reality content with respect to the full 6DOF. For example, if the ambient light is too low or if the environment lacks a sufficient number of trackable features, the artificial reality application executing on console 106 and/or HMD 112 may be unable to accurately perform feature tracking. This may cause the artificial reality application to inaccurately compute poses using 6DOF, which may negatively impact the experience of user 110 because the real-world motion of user 110 (e.g., captured as movement of HMD 112) does not align with rendered motion within the artificial reality world. As another example, if latency of network 104 becomes too high or artificial reality system 1 does not have sufficient software and/or hardware resources to compute poses using 6DOF based on current loading, user 110 may experience stuttering, lag, reduced frame rates, or other negative consequences. In such situations, the artificial reality application may automatically and dynamically transition to the mode in which, with respect to computation of pose estimates, motion of the frame of reference is only permitted with respect to 3DOF (e.g., rotational movement of the frame of reference). While the use of 3DOF may not provide as engaging of an experience as the use of 6DOF, the accuracy and/or quality of poses computed using 3DOF may be more robust to the degradation of these performance indicators than 6DOF. As a result, content rendered and displayed in accordance with the updated pose may provide a more realistic experience for user 110.

In some examples, the adaptive transition between use of different sets of DOF when computing poses is automatic based on application of the policies to the monitored performance indicators. In other examples, artificial reality system 1 performs the transition in response to receiving confirmation from a user, such as user 110. In some examples, artificial reality system 1 may default to computing the poses of HMD 112 using 6DOF. In other examples, artificial reality system 2 may default to computing the poses using 3DOF.

Accordingly, the techniques of the disclosure provide specific technical improvements to the computer-related field of rendering and displaying content within an artificial reality system. For example, artificial reality systems as described herein may provide a high-quality artificial reality experience to a user, such as user 110, of the artificial reality application by computing poses using full 6DOF when permitted. Further, responsive to sensing operating conditions and characteristics that may degrade the user's experience, such systems may be configured to seamlessly switch to computing poses using a reduced set of DOF, such as 3DOF. As examples, systems as described herein may avoid using 6DOF where software, hardware, network, or environmental conditions would otherwise cause degradation of the user experience. Further, example systems as described herein may reduce negative effects experienced by some users of artificial reality applications, such as disorientation, nausea, "swimminess," and other side effects.

Figure 1B:
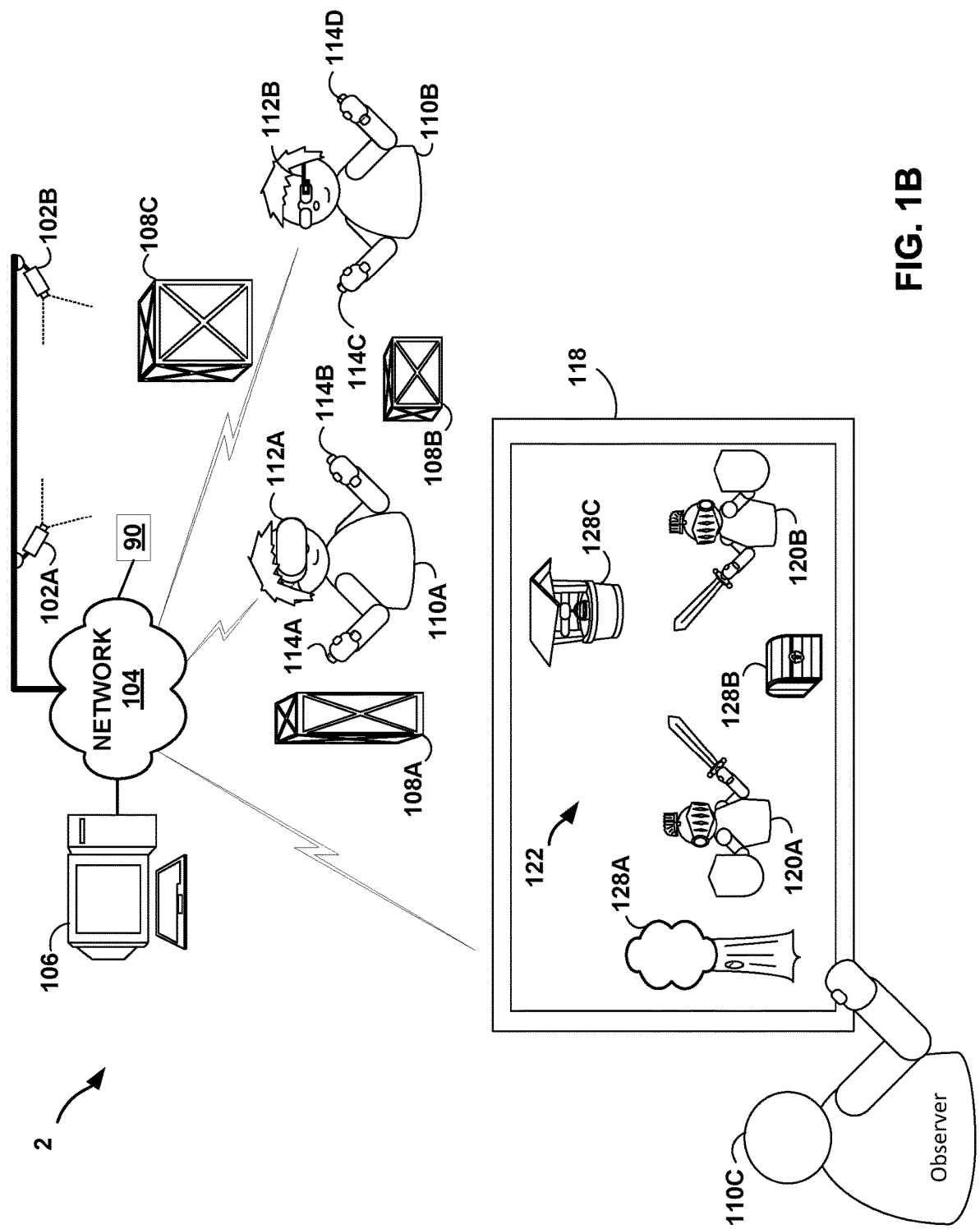
FIG. 1B is an illustration depicting another example artificial reality system that adaptively selects DOF for use in computing one or more poses when rendering content to users in accordance with the techniques of the disclosure.

FIG. 1B is an illustration depicting another example artificial reality system 2 that adaptively selects degrees of freedom for use in computing one or more poses when rendering content to users 110A-110C (collectively, "users 110") in accordance with the techniques of the disclosure. In this example, artificial reality system 2 includes cameras 102A and 102B (collectively, "cameras 102"), HMDs 112A and 112B (collectively, "HMDs 112"), controllers 114A-114D (collectively, "controllers 114"), console 106, and mobile device 118. Mobile device 118 may be, for example, a mobile phone, a laptop, a tablet computer, a wearable device such as smart glasses, a Personal Digital Assistant (PDA), and the like.

As shown in FIG. 1B, artificial reality system 2 represents a multi-user environment in which an artificial reality application executing on console 106, HMDs 112 and/or mobile device 118 presents artificial reality content to each user based on a current viewing perspective of a corresponding frame of reference for that user. That is, in this example, the artificial reality application constructs artificial content by tracking and computing pose information for a frame of reference for each of HMDs 112 and mobile device 118. Artificial reality system 2 uses data received from cameras 102, HMDs 112, controllers 114, and mobile device 118 to capture 3D information within the real world environmental, such as motion by users 110 and/or tracking information with respect to users 110 and objects 108A, for use in computing updated pose information for a corresponding frame of reference of HMDs 112 or mobile device 118. As one example, the artificial reality application may render, based on a current viewing perspective determined for mobile device 118, artificial reality content 122 having content objects 128A-128C as spatially overlaid upon real world objects 108A-108C (collectively, "objects 108"). Further, from the perspective of mobile device 118, artificial reality system 2 renders avatars 120A, 120B based upon the estimated positions for users 110A, 110B, respectively.

In a manner similar to the example discussed above with respect to FIG. 1A, artificial reality system 2 performs adaptive DOF selection based on performance indicators determined by the artificial reality application with respect to current operating conditions or characteristics of artificial reality system 2. In this way, as explained herein, artificial reality system 2 may operate to provide a high-quality and more realistic artificial reality experience for user 110 and avoid inaccuracies that may otherwise arise.

Figure 2:
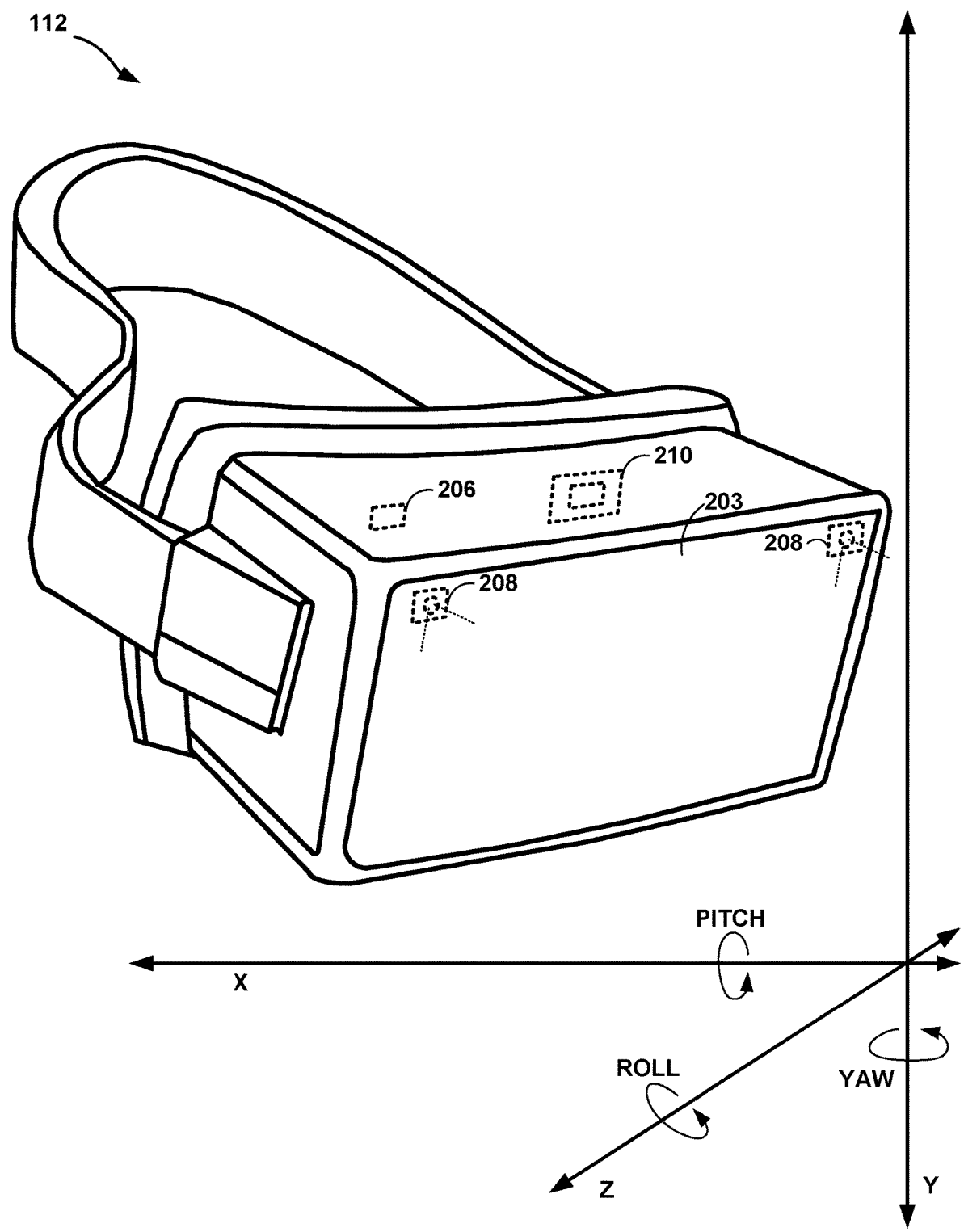
FIG. 2 is an illustration depicting an example HMD that operates in accordance with the techniques of the disclosure.

FIG. 2 is an illustration depicting an example HMD 112 configured to operate in accordance with the techniques of the disclosure. HMD 112 of FIG. 2 may be an example of any of HMDs 112 of FIGS. 1A and 1B. HMD 112 may be part of an artificial reality system, such as artificial reality systems 1, 2 of FIGS. 1A, 1B, or may operate as a stand-alone, mobile artificial realty system configured to implement the techniques described herein.

In this example, HMD 112 includes a front rigid body and a band to secure HMD 112 to a user. In addition, HMD 112 includes an interior-facing electronic display 203 configured to present artificial reality content to the user. Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user.

As further shown in FIG. 2, in this example HMD 112 further includes one or more motion sensors 206, such as one or more accelerometers (also referred to as inertial measurement units or "IMUs") that output data indicative of current acceleration of HMD 112 with respect to 3DOF, typically roll, pitch and yaw. Moreover, HMD 112 may include one or more integrated image capture devices 208, such as a video camera, laser scanner, Doppler radar scanner, depth scanner, or the like, configured to output image data representative of a surrounding real-world environment. HMD includes an internal control unit 210, which may include an internal power source and one or more printed-circuit boards having one or more processors, memory, and hardware to provide an operating environment for executing programmable operations to process sensed data and present artificial-reality content on display 203.

In one example, in accordance with the techniques described herein, control unit 201 is configured to, based on the sensed data, compute a current pose for a frame of reference of HMD 112 using an adaptively selected set of DOF and, in accordance with the current pose, display artificial reality content to the user. As explained herein, in accordance with the techniques of the disclosure, control unit 210 may adaptively transition between use of different DOF when computing pose updated based on performance indicators with respect to current operating conditions or characteristics of the artificial reality system.

As one example, control unit 210 HMD 112 may be configured to operate in a first mode to determine a position and/or an orientation using 6DOF. For example, while operating in the first mode, control unit 210 of HMD 112 is configured to determine one or more poses within the artificial reality environment using both rotational transformations of the viewing perspective (e.g., rotational movement along a vertical, transverse, or longitudinal axis of HMD 112) and translational transformations of the viewing perspective (e.g., translational movement along the vertical, transverse, or longitudinal axis of HMD 112). HMD 112 may, based on application of policies, dynamically transition to operating in a second mode in which control unit 210 is configured to determine a position and/or an orientation using only 3DOF. For example, while operating in the second mode, HMD 112 may determine one or more poses within the artificial reality environment using only rotational transformations of the viewing perspective while preventing translational transformations of the viewing perspective.

In another example, rather than locally compute pose estimates, control unit 210 relays sensed data, such as motion data from motion sensor 206 and image data from image capture devices 208, to an external console, such as console 106 of FIGS. 1A, 1B, for pose tracking using adaptive DOF selection in accordance with the techniques described herein. The information may include performance telemetry, movement information, user commands, and other information relevant to rendering a 3D pose in the artificial reality environment. Based on the relayed data, console 106 computes estimated movement of the frame of reference of HMD 112 with respect to only the permissible DOF of the selected set, thereby operating to provide a high-quality and more realistic artificial reality experience for user 110 and avoid inaccuracies that may otherwise arise.

Figure 3:
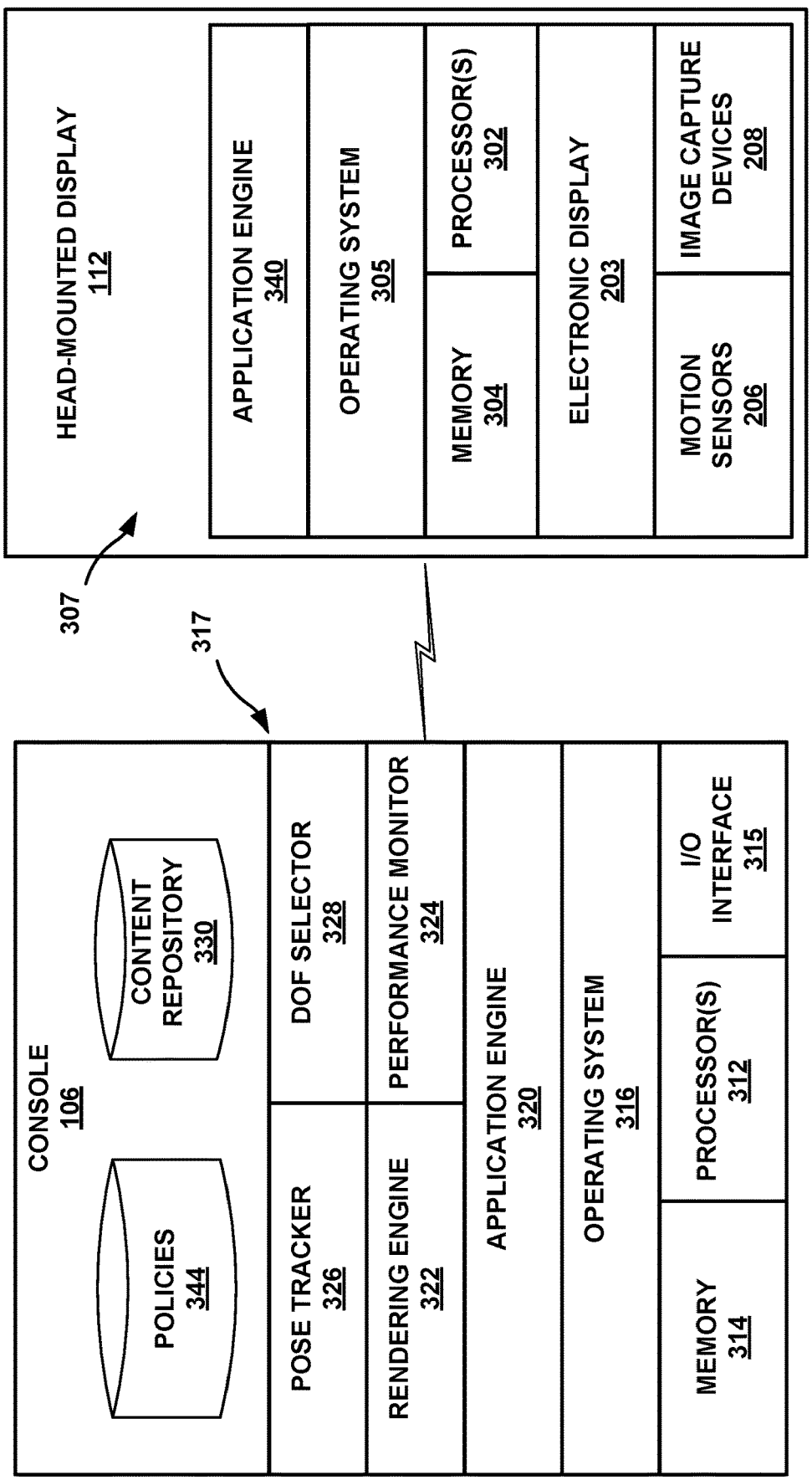
FIG. 3 is a block diagram showing example implementations of the console and HMD of FIGS. 1A, 1B.

FIG. 3 is a block diagram showing example implementations of console 106 and head mounted display 112 of FIGS. 1A, 1B. In the example of FIG. 3, console 106 performs pose tracking for HMD 112 using adaptive DOF selection in accordance with the techniques described herein based on sensed data, such as motion data and image data from received from HMD 112 and/or external sensors.

In this example, HMD 112 includes one or more processors 302 and memory 304 that, in some examples, provide a computer platform for executing an operation system 305, which may be an embedded, real-time multitasking operating system. In turn, operating system 305 provides a multitasking operating environment for executing one or more software components 317. As discussed with respect to the example of FIG. 2, processors 302 are coupled to electronic display 306, motion sensors 206 and image capture devices 208. In some examples, processors 302 and memory 304 may be separate, discrete components. In other examples, memory 304 may be on-chip memory collocated with processors 302 within a single integrated circuit.

In general, console 106 is a computing device that processes image and tracking information received from camera 102 (FIG. 1B) and/or HMD 112 to compute one or more poses for HMD 112 within the artificial reality environment. In some examples, console 106 is a single computing device, such as a workstation, a desktop computer, a laptop. In some examples, at least a portion of console 106, such as processors 352 and/or memory 354, may be distributed across a cloud computing system, a data center, or across a network, such as the Internet, another public or private communications network, for instance, broadband, cellular, Wi-Fi, and/or other types of communication networks, for transmitting data between computing systems, servers, and computing devices.

In the example of FIG. 3, console 106 includes one or more processors 312 and memory 314 that, in some examples, provide a computer platform for executing an operation system 316, which may be an embedded, real-time multitasking operating system. In turn, operating system 316 provides a multitasking operating environment for executing one or more software components 317. Processors 312 are coupled I/O interface 315, which provides one or more I/O interfaces for communicating with external devices, such as a keyboard, game controllers, display devices, image capture devices, and the like. Moreover, I/O interfaces 315 may include one or more wired or wireless network interface controllers (NICs) for communicating with a network, such as network 104. Each of processors 302, 312 may comprise any one or more of a multi-core processor, a controller, a digital signal processor (DSP), an application specific integrated circuit (ASIC), a field-programmable gate array (FPGA), or equivalent discrete or integrated logic circuitry. Memory 304, 314 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Software applications 317 of console 106 operate to provide an overall artificial reality application. In this example, software applications 317 include application engine 320, rendering engine 322, performance monitor 324, pose tracker 326, and DOF selector 328.

In general, application engine 314 includes functionality to provide and present an artificial reality application, e.g., a teleconference application, a gaming application, a navigation application, an educational application, training or simulation applications, and the like. Application engine 314 may include, for example, one or more software packages, software libraries, hardware drivers, and/or Application Program Interfaces (APIs) for implementing an artificial reality application on console 106. Responsive to control by application engine 320, rendering engine 322 retrieves content from content repository 330 and constructs 3D artificial reality content for display to the user by application engine 340 of HMD 112.

Application engine 320 and rendering engine 322 construct the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may be overlaid, at least in part, upon the real-world 3D environment of user 110. During this process, pose tracker 326 operates on sensed data received from HMD 112, such as movement information and user commands, and, in some examples, data from any external sensors 90 (FIGS. 1A, 1B), such as external cameras, to capture 3D information within the real world environmental, such as motion by user 110 and/or feature tracking information with respect to user 110. Based on the sensed data, pose tracker 326 determines a current pose for the frame of reference of HMD 112 and, in accordance with the current pose, constructs the artificial reality content for communication to HMD 112 for display to the user.

In accordance with the techniques of the disclosure, DOF selector 328 performs adaptive DOF selection based on performance indicators determined by performance monitor 324 with respect to current operating conditions or characteristics of the artificial reality system. DOF selector 328 adaptively applies one or more policies to the current performance indicators to dynamically select, in real-time or pseudo real-time, between different sets of permissible degrees of freedom for estimated motion (i.e., estimated rotations and translations). Pose tracker 326 uses the selected degrees of freedom when computing a current pose for the frame of reference of HMD 112. That is, when determining an updated pose for HMD 112 for the current viewing perspective, pose tracker 326 processes current motion data using the degrees of freedom selected by DOF selector 328, which in some examples may be only a subset of the available DOF. In other words, based on the current data captured from motion sensors 206, image capture devices 208 and/or any external sensors, pose tracker 326 computes estimated movement of the frame of reference with respect to only the permissible degrees of freedom of the set selected by DOF selector 328, thereby operating to provide a high-quality and more realistic artificial reality experience for user 110 and avoid inaccuracies that may otherwise arise.

In some examples, each performance indicator is associated with a corresponding performance threshold defined by a respective one of policies 344, which may take the form of a policy database or ruleset. DOF selector 328 applies one or more of policies 344 to the performance indicators computed by performance monitor 324 to determine whether a transition condition has been satisfied, thereby triggering usage of a different set of DOF. Upon meeting or exceeding the performance threshold value for a particular performance indicator, DOF selector 328 dynamically selects between the different sets of permissible DOF to be used by pose tracker 326 in computing an updated pose for the frame of reference of HMD 112. As explained herein, in one example, performance monitor 324 may monitor operating conditions and characteristics to determine current performance indicators, and DOF selector 328 may apply policies to the current performance indicators to dynamically select between a first mode in which computed motion of the frame of reference is permitted with respect to a full 6DOF (e.g., both rotational and translational movement of the frame of reference) and a second mode in which motion of the frame of reference is permitted with respect to only 3DOF (e.g., rotational movement of the frame of reference).

Performance indicators computed by performance monitor 324 may include, for example, image tracking quality, eye tracking quality, environmental brightness, line-of-sight, image texture, a number of real-world features and corresponding artificial-reality world features, characteristics of the real-world features, or other visibility conditions affecting image tracking, rendering quality, network performance or latency, computing resource usage, jitter, or other factors that may negatively impact the ability of pose tracker 326 to compute poses of HMD 112. In some examples, a user may define or configure performance indicators, such as adding or removing policies specifying criteria or thresholds for various performance indicators. To compute performance indicators, pose tracker 326 may operate on input from one or more sensors, such as photosensors or photodiodes, network monitors, hardware monitors, sensors, accelerometers, IMUs and the like.

Figure 4:
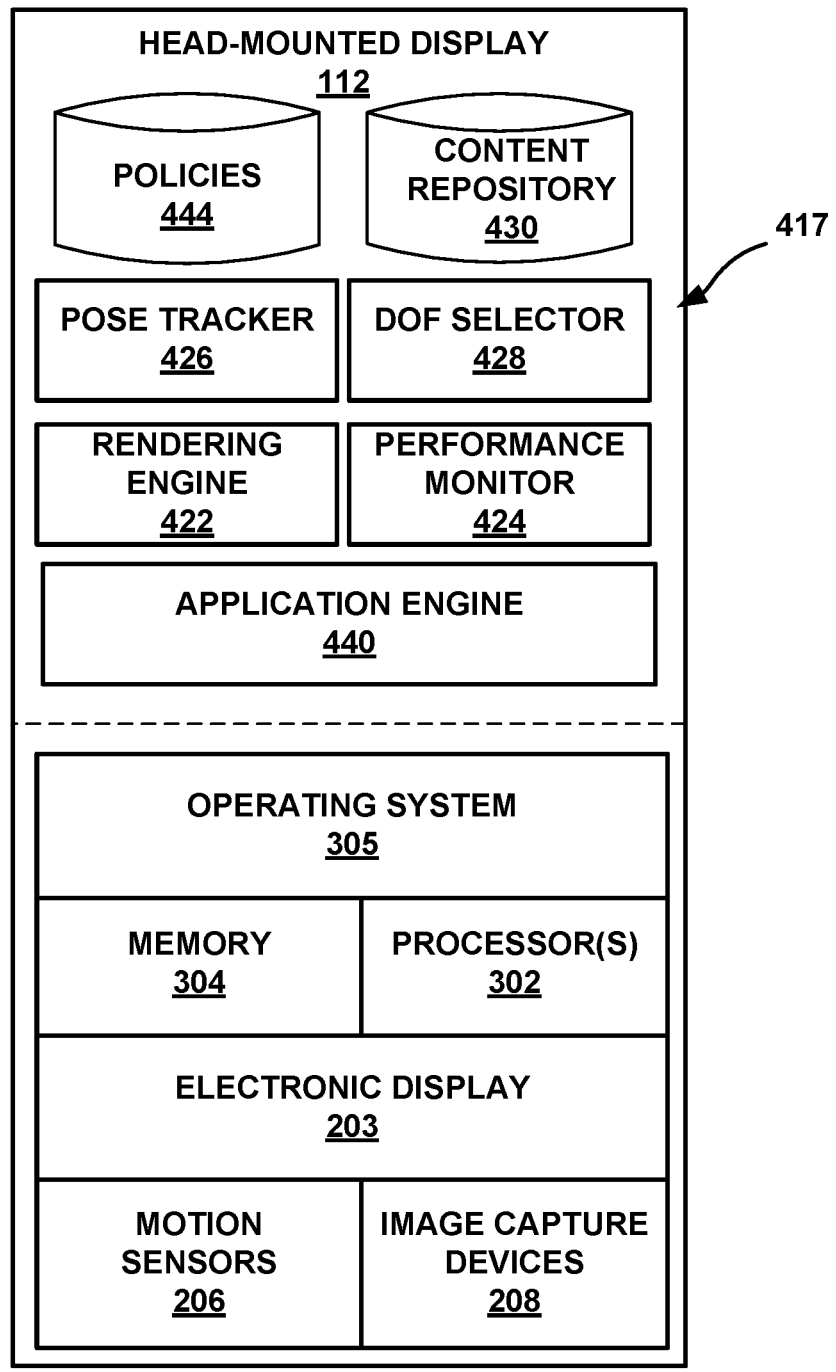
FIG. 4 is a block diagram depicting an example in which pose tracking and DOF selection is performed by the HMD of FIGS. 1A, 1B to render artificial reality content in accordance with the techniques of the disclosure.

FIG. 4 is a block diagram depicting an example in which pose tracking and DOF selection is performed by HMD 112 of FIGS. 1A, 1B to render artificial reality content in accordance with the techniques of the disclosure.

In this example, similar to FIG. 3, HMD 112 includes one or more processors 302 and memory 304 that, in some examples, provide a computer platform for executing an operation system 305, which may be an embedded, real-time multitasking operating system. In turn, operating system 305 provides a multitasking operating environment for executing one or more software components 417. Moreover, processor(s) 302 are coupled to electronic display 306, motion sensors 206, and image capture devices 208.

In the example of FIG. 4, software components 417 operate to provide an overall artificial reality application. In this example, software applications 417 include application engine 440, rendering engine 422, performance monitor 424, pose tracker 426, and DOF selector 428. In various examples, software components 417 operate similar to the counterpart components of console 106 of FIG. 3 (e.g., application engine 320, rendering engine 322, performance monitor 324, pose tracker 326, and DOF selector 328) to construct the artificial content for display to user 110 in accordance with current pose information for a frame of reference. For example, based on the current viewing perspective, rendering engine 422 constructs the 3D, artificial reality content which may be overlaid, at least in part, upon the real-world 3D environment of user 110. In accordance with the techniques of the disclosure, DOF selector 428 performs adaptive DOF selection based on performance indicators determined by performance monitor 424 with respect to current operating conditions or characteristics of the artificial reality system. DOF selector 428 adaptively applies one or more policies to the current performance indicators to dynamically select, in real-time or pseudo real-time, between different sets of permissible DOF for estimated motion (i.e., estimated rotations and translations). DOF selector 428 applies one or more of policies 444 to the performance indicators computed by performance monitor 424 to determine whether a transition condition has been satisfied, thereby triggering usage of a different set of DOF. Pose tracker 426 uses the selected DOF when computing a current pose for the frame of reference of HMD 112, thereby operating to provide a high-quality and more realistic artificial reality experience for user 110 and avoid inaccuracies that may otherwise arise.

Figure 5A:
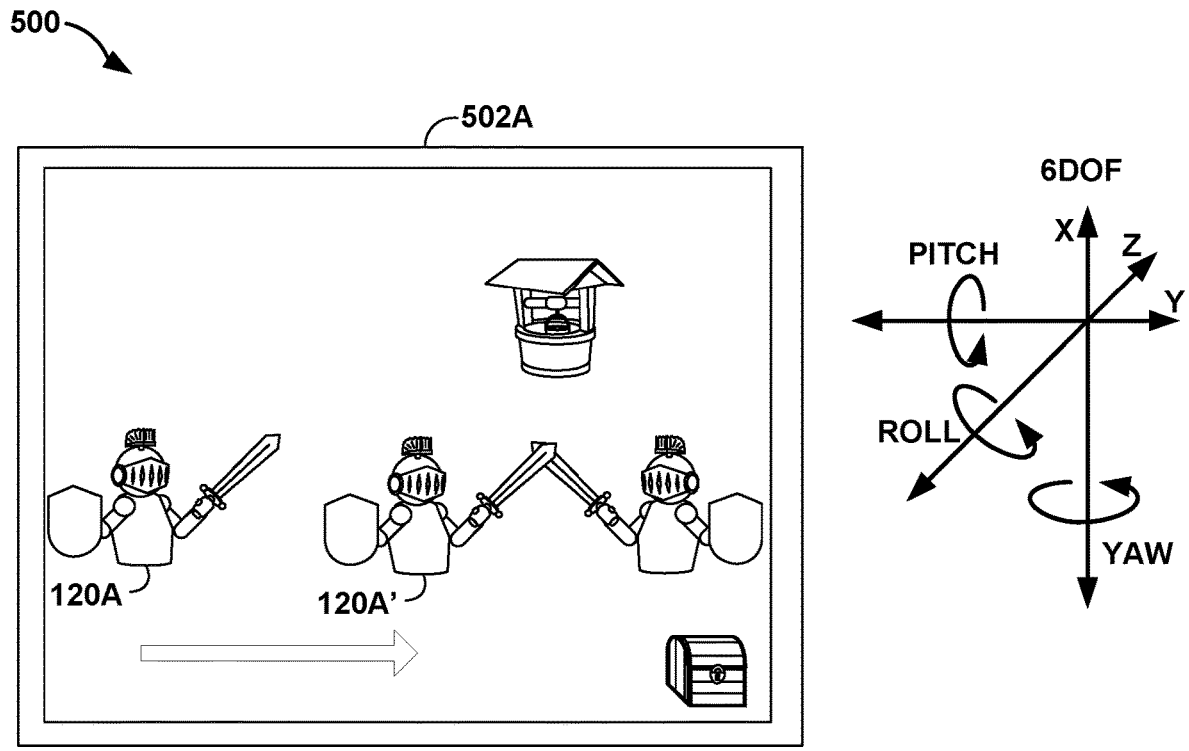
FIGS. 5A-5B are illustrations depicting artificial reality content rendered in accordance with the techniques of the disclosure.
Figure 5B:
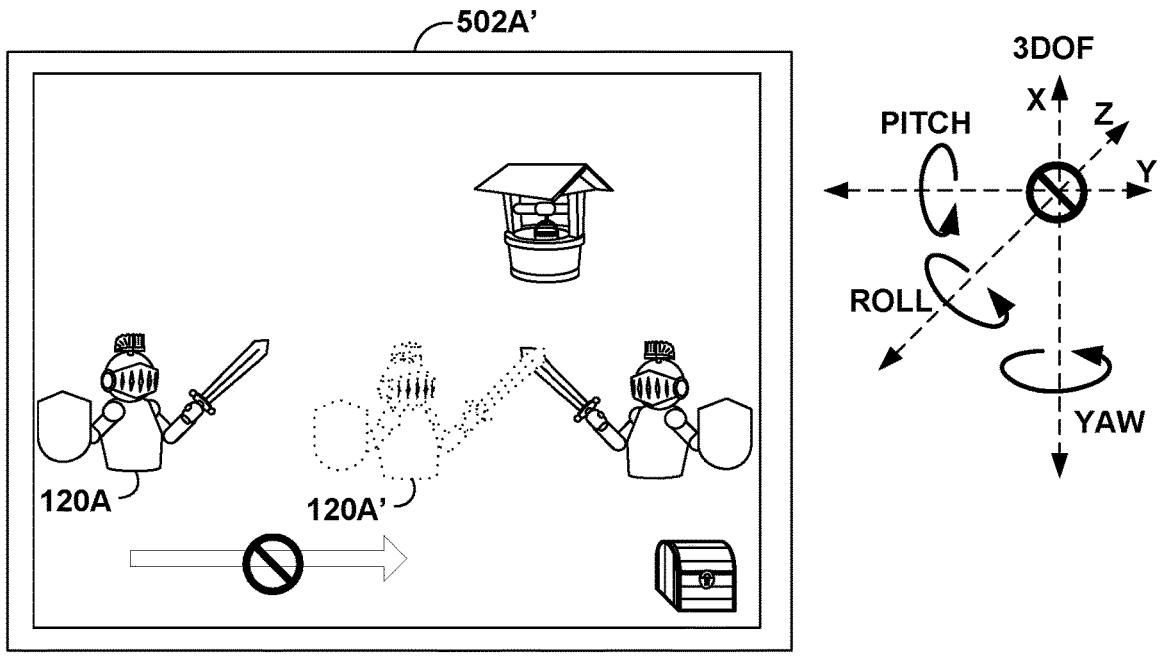

FIGS. 5A-5B are illustrations depicting artificial reality content rendered in accordance with the techniques of the disclosure. For purposes of example, FIGS. 5A-5B are described with respect to FIG. 3 in which pose tracking and DOF selection based on monitored performance indicators is performed by console 106. However, the artificial reality content of FIGS. 5A-5B may be implemented by other systems, such as the example system of FIG. 4 in which local pose and DOF selection is performed by HMD 112.

In the example scene 502A of FIG. 5A, pose tracker 326 is operating in a first mode in which pose tracker 326 computes one or more poses of HMD 112 within a 3D environment using 6DOF. For example, while operating in the first mode, pose tracker 326 processes sensed input data e.g., motion & translational information from HMD 112, image data from one or more cameras, etc.) to determine one or more poses for HMD 112 using both rotational transformations of the viewing perspective (e.g., rotational movement along a vertical, transverse, or longitudinal axis of HMD 112) and translational transformations of the viewing perspective (e.g., translational movement along the vertical, transverse, or longitudinal axis of HMD 112). Rendering engine 322 of console 106 renders artificial reality content 122 based on the computed pose and outputs rendered artificial reality content 122 as artificial reality scene 502A for display by, e.g., HMD 112A to user 110. As shown in the example scene 502A of FIG. 5A, rendering engine 322 has rendered artificial reality content depicting translational movement of avatar 120A to a second position shown as avatar 120A'.

In the example scene 502B of FIG. 5B, pose tracker 326 is operating in a second mode in which pose tracker 326 computes one or more poses of HMD 112 within a 3D environment using 3DOF. That is, in this example, DOF selector 328 has applied one or more policies to performance indicators determined by performance monitor 324 to switch from the first mode in which pose tracker 326 computes the poses of HMD 112 using 6DOF to the second mode in which pose tracker 326 computes the one or more poses using 3DOF. For example, while operating in the second mode, pose tracker 326 determines one or more poses for HMD 112 by permitting only rotational transformations of the viewing perspective and preventing translational transformations of the viewing perspective that may be, for example, caused by inaccurate data or approximations due to suboptimal operating conditions. Rendering engine 322 of console 106 renders artificial reality content 122 based on the computed pose and outputs the rendered content as artificial reality scene 502 for display by, e.g., HMD 112A to user 110. As shown in the example scene 502B of FIG. 5B, when operating in the second mode, pose tracker 326 prevents translation movements even when processing sensed input data as in the prior example of scene 502A. That is, because performance monitor 324 has determined that one or more performance indicators indicate that the input data may be inaccurate or of low quality, DOF selector 328 has adaptively triggered selection of the second mode in which pose tracker 326 computes the one or more poses using 3DOF. As a result, in processing the sensed input data (e.g., motion & translational information from HMD 112, image data from one or more cameras, etc.), pose tracker 326 has allowed only rotational movements when determining an updated pose. Rendering engine 322 has rendered content based on the updated pose, in this case translational movement of avatar 120A to a second position has been prevented, as shown as avatar 120A' in scene 502B.

Figure 6:
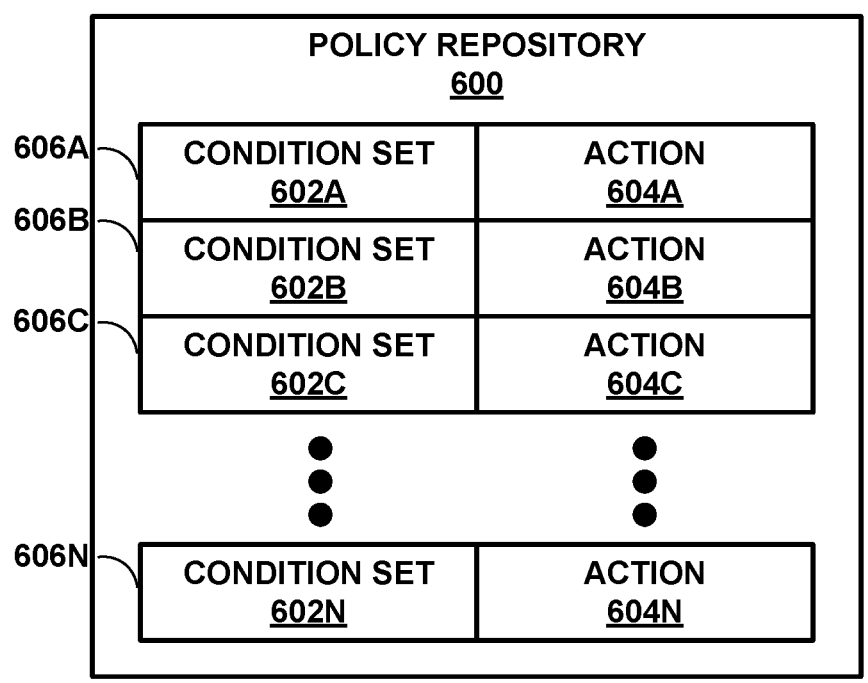
FIG. 6 is a block diagram depicting an example implementation of the polices of FIGS. 3, 4 as a policy repository in accordance with the techniques of the disclosure.

FIG. 6 is a block diagram depicting an example implementation of polices 344, 444 (FIGS. 3, 4) as a policy repository 600 in accordance with the techniques of the disclosure. For purpose of example, policy repository 600 is described with respect to DOF selector 328 and system 300 of FIG. 3. However, policy repository 600 may be implemented by other systems, such as DOF selector 428 and system 400 of FIG. 4.

As described above, performance monitor 324 monitors current operating conditions of system 300 to compute performance indicators. DOF selector 328 applies one or more of policies 606 of policy repository 600 to the computed performance indicators to select between a first mode in which pose tracker 326 computes one or more poses of HMD 112 within a 3D environment using a first set of DOF (e.g., 6DOF) and a second mode in which pose tracker 326 computes the one or more poses using a second set of DOF (e.g., 3DOF). In the examples described above, policy repository 600 may be stored in memories 304, 314.

In this example, policy repository 600 includes a plurality of policies 606. Each policy 606 is associated with a respect one of condition sets 602A-602N (collectively, "condition sets 602") and one of a plurality of actions 604A-604N (collectively, "actions 604"). In this way, each policy 606 defines a set of required conditions (condition set 602) and associates the set of conditions with a respective action 604. For example, upon determining that a condition set 602 is satisfied for a given one of policies 606, DOF selector 328 executes the corresponding action 604. Each action 604 specifies an action for DOF selector 328 to take upon determining that the corresponding condition 602 is satisfied and typically defines a set of DOF to use upon satisfaction of the condition set. For example, policies 600 may define actions in the form of transitions, based on condition sets 604, between the first mode in which pose tracker 326 computes the poses of HMD 112 using 6DOF and the second mode in which pose tracker 326 computes the poses using 3DOF. In some examples, a user may configure or change the action specified for each action 604.

In some examples, each condition set 602 specifies one or more performance indicators computed from monitored conditions and criteria (e.g., greater than a threshold, less than a threshold, within a range) for each of the one or more performance indicators. Each of the performance indicators relate to conditions that may affect an ability of pose tracker 326 to accurately compute poses of HMD 112 using 6DOF. Performance indicators may be computed in a variety of forms (e.g., current performance level on a scale, a degradation percentage, a loss ratio and the like) for various monitored conditions, such as image tracking quality, eye tracking quality, environmental brightness, line-of-sight, image texture, a number of real-world features and corresponding artificial-reality world features, characteristics of the real-world features, or other visibility conditions affecting image tracking, rendering quality, network performance or latency, computing resource usage, jitter, or other factors that may negatively impact the ability of system 2 to compute poses of HMD 112. In some examples, a user may define or configure condition sets 602, such as adding or removing condition sets 602 or editing existing condition sets 602, e.g., by adjusting or changing a threshold and/or range specified by a condition.

As one example, a first condition set (condition set 602) specifies a threshold for a performance indicator computed from monitored network latency. Performance monitor 324 monitors network performance (possibly by communication with I/O interface 315 to access network performance data), determines a performance indicator (such as an average latency, max latency, raw latency time). DOF selector 328 applies policy 602A to determine whether the performance indicator for network latency satisfies the criteria specifies for network latency by condition set 602A (such as in excess of threshold latency), and as such, that condition set 602A is satisfied. DOF selector 328 operates in response to the application of the policy. For example, action 604A may specify that DOF selector 328 selects the second mode in which pose tracker 326 computes the poses of HMD 112 within the 3D environment using 3DOF due to high network latency. Counterpart policies may be defined for triggering use of 6DOF for pose computation when network latency returns to a satisfactory level, and hysteresis, if desired, may be defined within the criteria of the policies to prevent excessive switching between different sets of DOF.

As a more complex example, condition set 602C of policy 606C may specify a threshold for a sum of: (1) the number of real-world features currently being tracked by application engine 340 of HMD 112 using image capture devices 208 (FIG. 2) and (2) a number of real-world features currently being tracked by application engine 320 of console 106. Based on these monitored conditions, performance monitor 324 computes the defined performance indicator as the specified sum of overall features tracked. DOF selector 328 applies policy 606C to the defined performance indicator. For example, DOF selector 328 may determine that the sum of the number of real-world features tracked is less than a threshold specified by condition set 602C, and as such, that condition 602C is satisfied. Further, action 604C may specify that DOF selector 328 select the second mode in which pose tracker 326 computes the poses of HMD 112 within the 3D environment using 3DOF. In this way, performance monitor 324 and DOF selector 328 may cause pose tracker 326 to switch from the first mode in which pose tracker 326 computes the poses of HMD 112 using 6DOF to the second mode in which pose tracker 326 computes the poses using 3DOF. Similarly, counterpart policies may be defined for triggering use of 6DOF for pose computation when the number of features currently being tracked by the artificial reality system meets or exceeds the define threshold.

In other examples, a give condition set 602 may define a plurality of conditions, each with which may be defined with respect to one or more performance indicators. In this way, policies 606 may define actions that are triggered based on rules that specific complex, combinations of different performance indicators.

As yet another example, policy repository 600 specifies a default mode for computing the poses of HMD 112 if no condition 602 is satisfied. For example, DOF selector 328 determines that the number of real-world features currently being tracked by the application engines of HMD 112 and console 106 is greater than the threshold for the number of real-world features required by condition 602C, and as such, that condition 602C is no longer satisfied. Because, in this example, no policies triggering 3DOF are satisfied, DOF selector 328 may apply a default policy, which in turn directs DOF selector 328 to select 6DOF and cause pose tracker 326 to switch from the second mode in which pose tracker 326 computes the poses of HMD 112 using 3DOF back to the first mode in which pose tracker 326 computes the poses using 6DOF.

In some examples, console 106, HMD 112 or another component of an artificial reality system, such as a cloud-based service or management platform, presents a user interface by which user 110 or an administrator may edit policy repository 600. The user interface may include various U/I mechanisms for adding, removing and editing policies, including input and output fields for defining condition sets as rules for applying criteria to performance indicators for controlling transitions between modes that utilize different DOF when computing pose updates and rending content for an artificial reality environment.

Figure 7:
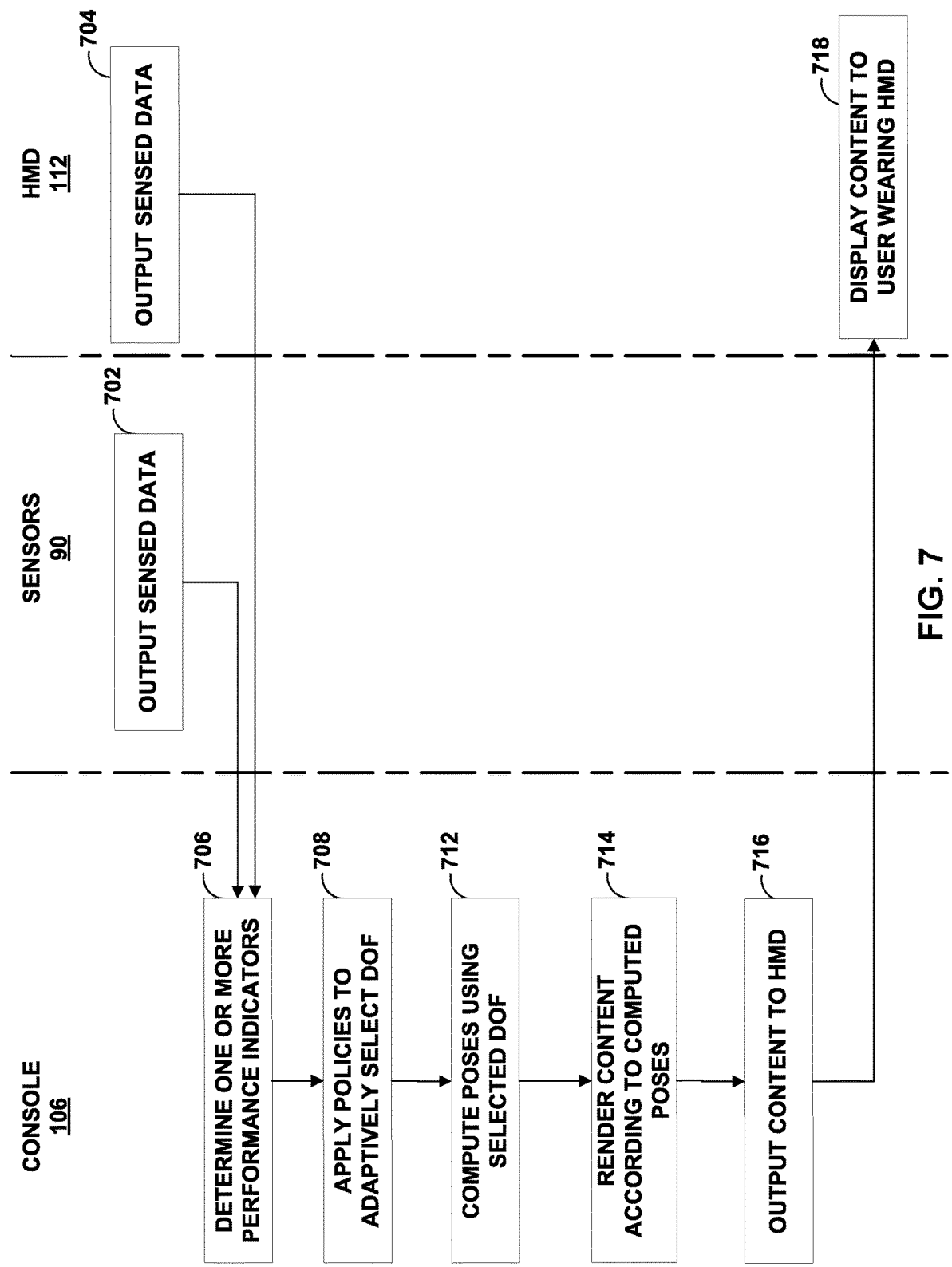
FIG. 7 is a flowchart illustrating an example operation for adaptively selecting DOF for use in computing one or more poses in accordance with the techniques of the disclosure.

FIG. 7 is a flowchart illustrating an example operation for adaptively selecting DOF for use in computing one or more poses in accordance with the techniques of the disclosure. For purposes of example, the flowchart of FIG. 7 is described with respect to operation of example console 106, HMD 112 and other components of FIG. 3. However, the operation of FIG. 7 may be implemented by other systems, such as HMD 112 of FIG. 4.

During operation, sensors 90 monitor operating conditions and output data indicative of current operating conditions to processors 312 of console 106 (702). The sensed data may include, for example, one or more integral or external image capture devices, photosensors, network monitors, hardware or software resource monitors and the like that monitor components of the artificial reality system and output monitoring data. Likewise, processors 302 of HMD 112 monitor operating conditions of HMD 112 and output the sensed data to processors 312 of console 106 (704). The information output by HMD 112 may include, e.g., performance telemetry, movement information, user commands, number of features tracked, current network performance data such as latency, jitter, burstiness, and/or other information relevant to rendering content.

Performance monitor 324 executed by processors 312 of console 106 process the received performance information to determine one or more performance indicators that may affect the quality of artificial reality content 122. For example, performance monitor 324 may determine performance indicators such as a quality level of image tracking, an eye tracking quality, environmental brightness, line-of-sight, image texture, a number of real-world features and corresponding artificial-reality world features, characteristics of the real-world features, or other visibility conditions affecting image tracking, rendering quality, network performance or latency, computing resource usage, jitter, or other factors that may negatively impact the ability of artificial reality system 2 to compute poses of HMD 112 using a full 6DOF.

DOF selector 328 of console 106 applies condition sets defined by policies 344 to the computed performance indicators to adaptively select DOF for computation of poses for HMD 112 (708). For example, DOF selector 328 applies policies to the performance indicators to determine whether a transition condition has been satisfied. Upon satisfying a condition set for a particular policy with respect to one or more performance indicators, DOF selector 328 directs pose tracker 326 to transition from computing poses using a current set of DOF (e.g. 6DOF) to computing poses using a second set of DOF (e.g. 3DOF). For example, upon determining that feature tracking is negatively affected or if rendering quality is poor, DOF selector 328 may cause pose tracker 326 to transition from computing the poses of HMD 112 using 6DOF to computing the poses of HMD 112 using 3DOF. As another example, if the quality of feature tracking or rendering quality improves, then DOF selector 328 may cause pose tracker 326 to transition from computing the poses of HMD 112 using 3DOF back to computing the poses of HMD 112 using 6DOF.

Pose tracker 326 computes one or more poses for HMD 112 using the selected DOF (712). Further, rendering engine 322 renders artificial reality content 122 in accordance with the computed one or more poses (714). Processors 312 of console 106 output the rendered content to HMD 112 (716). In turn, processors 302 pf HMD 112 display the rendered content to a user wearing HMD 112, such as user 112 (718). Although the flowchart of FIG. 7 is described with respect to the example system of FIG. 3, in other examples, as described above, various functionality, such as any of pose computation, performance monitoring and DOF selection, may be implemented by HMD 112, console 106, or combinations thereof.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

What is claimed is:

1. An artificial reality system comprising:
   a head-mounted display (HMD) configured to output artificial reality content;
   a pose tracker configured to compute one or more poses of the HMD within a three-dimensional (3D) environment;
   a performance monitor, executing on one or more processors, configured to determine one or more performance indicators associated with the artificial reality system, wherein the one or more performance indicators comprise at least one of an eye tracking quality, a network performance or latency, a computing resource usage, or a measure of jitter;
   a degree-of-freedom (DOF) selector configured to:
      apply one or more policies to the performance indicators to determine that a transition condition has been satisfied; and
      select, based on the determination that the transition condition has been satisfied, between a first mode in which the pose tracker is configured to compute the one or more poses of the HMD using six degrees-of-freedom (6DOF) and a second mode in which the pose tracker is configured to compute the one or more poses using three degrees-of-freedom (3DOF); and a rendering engine configured to render the artificial reality content based on the computed pose.

2. The artificial reality system of claim 1, wherein, to compute the one or more poses of the HMD using 6DOF, the pose tracker is further configured to compute one or more poses of the HMD with respect to both rotational movement and translational movement by the HMD, wherein, to compute the one or more poses of the HMD using 3DOF, the pose tracker is further configured to compute the one or more poses of the HMD with respect to rotational movement by the HMD but not translational movement by the HMD, wherein the rotational movement by the HMD comprises rotational movement about at least one of a vertical axis of the HMD, a transverse axis of the HMD, or a longitudinal axis of the HMD, and wherein the translational movement by the HMD comprises translational movement along at least one of the vertical axis of the HMD, the transverse axis of the HMD, or the longitudinal axis of the HMD.

3. The artificial reality system of claim 1, wherein, to apply the one or more policies to the performance indicators to select between the first mode and the second mode, the DOF selector is further configured to:

apply the one or more policies to a quality level of image tracking determined by the performance monitor to determine that the transition condition has been satisfied; and select, based on the determination that the transition condition has been satisfied, between the first mode and the second mode.

4. The artificial reality system of claim 1, wherein, to apply the one or more policies to the performance indicators to select between the first mode and the second mode, the DOF selector is configured to:

apply the one or more policies to the eye tracking quality determined by the performance monitor to determine that the transition condition has been satisfied; and select, based on the determination that the transition condition has been satisfied, between the first mode and the second mode.

5. The artificial reality system of claim 1, wherein, to apply the one or more policies to the performance indicators to select between the first mode and the second mode, the DOF selector is configured to:

apply the one or more policies to a level of an environmental brightness determined by the performance monitor to determine that the transition condition has been satisfied; and select, based on the determination that the transition condition has been satisfied, between the first mode and the second mode.

6. The artificial reality system of claim 1, wherein, to apply the one or more policies to the performance indicators to select between the first mode and the second mode, the DOF selector is further configured to:

apply the one or more policies to a number of features currently being tracked by the artificial reality system to determine that the transition condition has been satisfied; and select, based on the determination that the transition condition has been satisfied, between the first mode and the second mode.

7. The artificial reality system of claim 1, wherein, to apply the one or more policies to the performance indicators to select between the first mode and the second mode, the DOF selector is further configured to:

apply the one or more policies to an image texture of a real-world feature determined by the performance monitor to determine that the transition condition has been satisfied; and select, based on the determination that the transition condition has been satisfied, between the first mode and the second mode.

8. The artificial reality system of claim 1, wherein, to apply the one or more policies to the performance indicators to select between the first mode and the second mode, the DOF selector is configured to:

apply the one or more policies to the network performance or latency determined by the performance monitor to determine that the transition condition has been satisfied; and select, based on the determination that the transition condition has been satisfied, between the first mode and the second mode.

9. The artificial reality system of claim 1, wherein, to apply the one or more policies to the performance indicators to select between the first mode and the second mode, the DOF selector is configured to:

apply the one or more policies to the computing resource usage determined by the performance monitor to determine that the transition condition has been satisfied; and select, based on the determination that the transition condition has been satisfied, between the first mode and the second mode.

10. The artificial reality system of claim 1, wherein, to apply the one or more policies to the performance indicators to select between the first mode and the second mode, the DOF selector is configured to:

apply the one or more policies to the measure of jitter determined by the performance monitor to determine that the transition condition has been satisfied; and select, based on the determination that the transition condition has been satisfied, between the first mode and the second mode.

11. The artificial reality system of claim 1, wherein the HMD comprises the performance monitor, the DOF selector, the pose tracker, and the rendering engine.

12. The artificial reality system of claim 1, further comprising a console device, wherein the console device comprises the performance monitor, the DOF selector, the pose tracker, and the rendering engine.

13. The artificial reality system of claim 1, wherein to apply the one or more policies to the performance indicators to select between the first mode in which the pose tracker computes the one or more poses of the HMD within the 3D environment using 6DOF and the second mode in which the pose tracker computes the one or more poses using 3DOF, the DOF selector is configured to apply the one or more policies to the performance indicators to switch from selecting the first mode in which the pose tracker computes the one or more poses of the HMD within the 3D environment using 6DOF to selecting the second mode in which the pose tracker computes the one or more poses of the HMD within the 3D environment using 3DOF, and wherein the pose tracker is further configured to switch from computing the one or more poses for the HMD within the 3D environment using 6DOF to computing the one or more poses for the HMD within the 3D environment using 3DOF.

14. The artificial reality system of claim 1, wherein to apply the one or more policies to the performance indicators to select between the first mode in which the pose tracker computes the one or more poses of the HMD within the 3D using 6DOF and the second mode in which the pose tracker computes the one or more poses using 3DOF, the DOF selector is configured to apply the one or more policies to the performance indicators to switch from selecting the second mode in which the pose tracker computes the one or more poses of the HMD within the 3D environment using 3DOF to selecting the first mode in which the pose tracker computes the one or more poses of the HMD within the 3D environment using 6DOF, and wherein the pose tracker is further configured to switch from computing the one or more poses for the HMD within the 3D environment using 3DOF to computing the one or more poses for the HMD within the 3D environment using 6DOF.

15. A method comprising:

determining one or more performance indicators associated with an artificial reality system having at least one head mounted display (HMD), wherein the one or more performance indicators comprise at least one of an eye tracking quality, a network performance or latency, a computing resource usage, or a measure of jitter;

applying one or more policies to the performance indicators to determine that a transition condition has been satisfied; and selecting, based on the determination that the transition condition has been satisfied, between a first mode in which one or more poses of the HMD within a three dimensional (3D) environment are computed using six degrees-of-freedom (6DOF) and a second mode in which the one or more poses are computed using three degrees-of-freedom (3DOF);

computing the one or more poses for the HMD within the 3D environment in accordance with the selected mode;

rendering artificial reality content based on the computed one or more poses; and outputting, by the HMD, the rendered artificial reality content.

16. The method of claim 15, wherein computing the one or more poses of the HMD using 6DOF comprises computing one or more poses of the HMD with respect to both rotational movement and translational movement by the HMD, wherein computing the one or more poses of the HMD using 3DOF comprises computing the one or more poses of the HMD with respect to rotational movement by the HMD but not translational movement by the HMD, wherein the rotational movement by the HMD comprises rotational movement about at least one of a vertical axis of the HMD, a transverse axis of the HMD, or a longitudinal axis of the HMD, and wherein the translational movement by the HMD comprises translational movement along at least one of the vertical axis of the HMD, the transverse axis of the HMD, or the longitudinal axis of the HMD.

17. The method of claim 15, wherein applying the one or more policies to the performance indicators to select between the first mode and the second mode further comprises:

applying the one or more policies to a quality level of image tracking to determine that the transition condition has been satisfied; and selecting, based on the determination that the transition condition has been satisfied, between the first mode and the second mode.

18. The method of claim 15, wherein applying the one or more policies to the performance indicators to select between the first mode and the second mode comprises:

applying the one or more policies to the eye tracking quality to determine that the transition condition has been satisfied; and selecting, based on the determination that the transition condition has been satisfied, between the first mode and the second mode.

19. The method of claim 15, wherein applying the one or more policies to the performance indicators to select between the first mode and the second mode comprises:

applying the one or more policies to the computing resource usage to determine that the transition condition has been satisfied; and selecting, based on the determination that the transition condition has been satisfied, between the first mode and the second mode.

20. A non-transitory, computer-readable medium comprising instructions that, when executed, cause one or more processors to:

determine one or more performance indicators associated with an artificial reality system having at least one head mounted display (HMD), wherein the one or more performance indicators comprise at least one of an eye tracking quality, a network performance or latency, a computing resource usage, or a measure of jitter;

apply one or more policies to the performance indicators to determine that a transition condition has been satisfied;

select, based on the determination that the transition condition has been satisfied, between a first mode in which one or more poses of the HMD within a three dimensional (3D) environment are computed using six degrees-of-freedom (6DOF) and a second mode in which the one or more poses are computed using three degrees-of-freedom (3DOF);

compute the one or more poses for the HMD within the 3D environment in accordance with the selected mode;

render artificial reality content based on the computed one or more poses; and output the rendered artificial reality content.

* * * * *